July 25, 1939. A. H. EMERY 2,167,332
RATE OF LOAD CONTROL APPARATUS FOR MATERIALS TESTING
Filed Aug. 16, 1935

INVENTOR
A. H. Emery
BY
ATTORNEY

Patented July 25, 1939

2,167,332

UNITED STATES PATENT OFFICE 2,167,332

RATE OF LOAD CONTROL APPARATUS FOR MATERIALS TESTING

Albert H. Emery, Stamford, Conn., assignor to Baldwin-Southwark Corporation, a corporation of Delaware Application August 16, 1935, Serial No. 36,530

2 Claims. (Cl. 235—103.5)

This invention relates generally to materials testing and more particularly to improved means for effecting a predetermined rate of loading of a specimen in a materials testing machine of any suitable type.

Various arrangements have heretofore been proposed for maintaining a predetermined rate of load application to a specimen, but such devices have been deficient either in providing a simple structure or in failing to afford maximum flexibility and ease of operation.

Certain of these prior devices have included a hand or device driven at a predetermined rate whereby by suitably adjusting the testing machine controls, a load responsive hand would move in synchronism with a load rate hand or device thereby insuring that load is applied to the specimen at said predetermined rate. Such rate of load hand has also been arranged to permit it to be adjusted to the zero position for starting a test and involves not only certain structural complications but also the necessary time for adjusting the pointer to zero or of waiting for the pointer to rotate around to its zero position before starting the test.

A further difficulty with the prior arrangements is that should the operator fail to maintain the desired rate of loading for a given short period, then in order to maintain the proper rate of loading with accuracy it would be necessary to temporarily speed up the rate of loading so as to bring the load responsive hand into alignment with the rate of load pointer.

It is one object of my invention to provide a simple, economical and yet thoroughly reliable means for permitting the operator to quickly establish a predetermined rate of loading without the necessity of making adjustments and to permit the operator to readily and accurately maintain the predetermined rate of loading in the event of momentarily losing his original position.

In one specific aspect of the invention I accomplish the foregoing objects by providing a load indicating hand actuated, in response to the load, through any suitable means of such form as may be required for various types of hydraulic or mechanical machines, and then employ a disc driven at any rate at which it is desired to load a specimen and provide on the face of such disc a plurality of circumferentially spaced markings preferably along a series of spiral lines. This disc is placed in superimposed relation to the load hand, specifically beneath the same but coaxial thereof whereby anyone of the multiplicity of markings can be instantly followed to determine the rate of load. Due to the spiral formation of the markings, they may be radially spaced apart a considerable distance, although in a circumferential direction they would have a very small angular spacing. This arrangement permits a wide spacing of the markings in all directions, thus giving ease in selecting any particular marking and this is accomplished without sacrifice of accuracy.

Other objects and advantages will be more apparent to those skilled in the art from the following description of the accompanying drawing in which.

Figure 1:
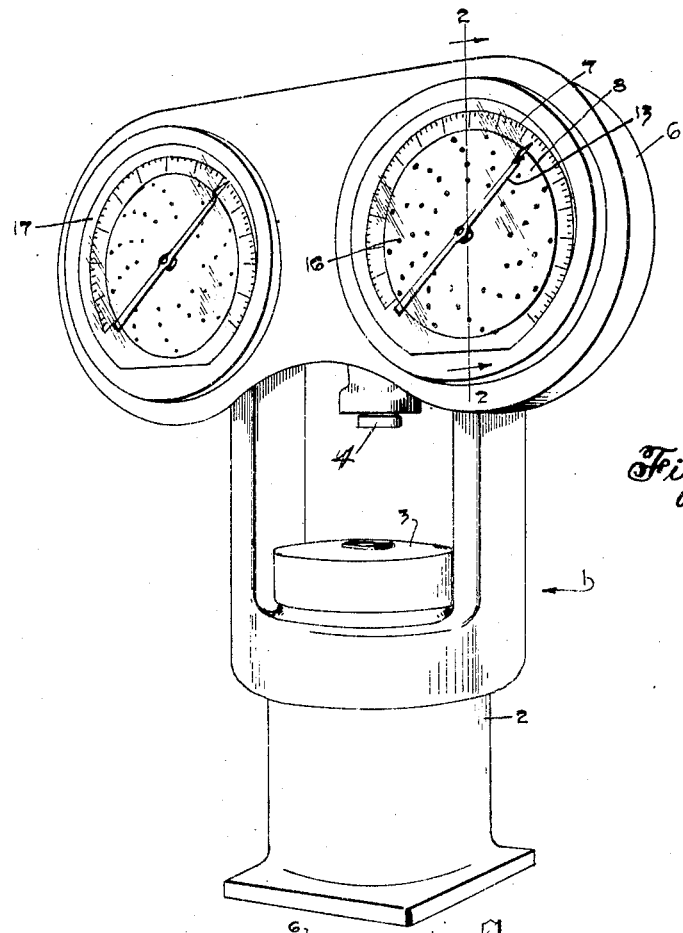
Fig. 1 is a perspective of one form of a materials testing machine among possible others that can embody my invention.
Figure 2:
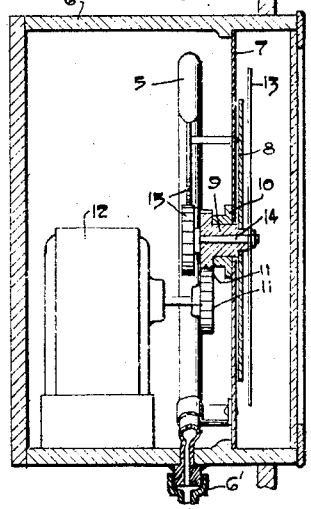
Fig. 2 is a vertical transverse section taken on the line 2—2 of Fig. 1.

In the particular embodiment of the invention which is shown herein merely for the purpose of illustrating one specific form among possible others that the invention might take in practice, I have shown in Fig. 1 a compression type hydraulic materials testing machine 1 having a ram-cylinder 2 for actuating a platen 3. A compression specimen is interposed between platen 3 and an upper platen 4. It will of course be understood that this machine is merely illustrative of one form of machine and that universal or other types of testing machines may be employed as well. One form of universal machine is shown in Emery Patent No. 1,848,468. The compression machine shown herein is specifically of the form shown in Emery and Ruch application, Serial No. 17,836, filed April 23, 1935. In the machines of such types, the load is applied to a specimen through a hydraulic ram, while the load actually applied to the specimen is weighed preferably through an independent hydraulic weighing system including a diaphragm type hydraulic support as shown in said Emery patent. This hydraulic support is connected to a Bourdon tube 5 through a suitable pipe 6'. It will of course be understood that hydraulic pressure directly in the ram-cylinder may be measured to give an approximate indication of the load. The specific form of materials testing machine does not per se form a part of my invention and hence it is deemed unnecessary to describe the same here as the prior art should suffice for such disclosures.

However, in the specific form of the invention as shown herein a Bourdon tube 5 is mounted within a suitable casing 6 and behind a stationary dial 7. Disposed immediately in front of said dial and coaxial therewith is a rate of load disc 8 secured to a sleeve 9 which is journalled in any suitable manner such as is diagrammatically shown at 10. Sleeve 9 is rotated in any appropriate manner, such for instance as by gears 11 driven by a variable electric motor 12 or other power means. The motor 12 may be a clockwork, a wattmeter or other equivalent mechanism. A load indicating hand 13 is secured to a shaft 14 which may be journalled in sleeve 9. This shaft is actuated by the Bourdon tube through the usual rack and pinion gear and linkages 15.

As shown in Fig. 1, the face of disc 8 is provided with a series of spaced dots or other suitable markings 16 disposed preferably along a series of spiral lines near the rim of the disc, such spiral lines broadly being inclined to planes radiating from the axis of disc rotation. Hence it is seen that while the dots 16 are radially spaced from each other by a considerable distance, yet the successive dots are only slightly angularly or circumferentially displaced from each other. As a result, the dots are clearly and readily visible as individual markings notwithstanding their very small angular displacement. Also the beginning of one series of markings comprises an operative continuation of the end of the preceding series in that the innermost marking of one series is circumferentially displaced from the outermost marking of the preceding series by an amount substantially equal to the circumferential spacing between the markings contained within a series. In the form of testing machine shown, two ranges of load indicating mechanism are employed one at 7 and the other at 17, both of which may be provided with their own rate of load disc, if desired. However, it will be understood that various types of machines and numbers of dials may be employed but that for purposes of this invention consideration of only one dial is necessary.

In operation, the operator will place a specimen in the machine and apply load thereto by operation of a pump or other suitable source of power for moving platen 3 against the specimen. As the load on the specimen increases, pressure in the hydraulic weighing system is transmitted through pipe 6' to Bourdon tube 5 thereby rotating load indicating hand 13. At the same time motor 12 is operated at a predetermined rate of speed, preferably constant, so as to similarly rotate rate-of-load indicating disc 8. To apply load to the specimen at the given rate, it is only necessary for the operator to so manipulate the controls of the machine that load indicating hand 13 is maintained in alignment or synchronism with any one of the various markings 16 which may be nearest to the hand at the instant when it is desired to commence the rate of load control. If for any reason the operator should not be able to maintain the alignment with the initially selected marking, it is then only necessary to establish alignment with the next nearest marking and attempt to maintain such alignment through suitable manipulation of the machine controls. From the foregoing mode of operation, it is seen that the weighing system together with the usual control mechanism for variably applying load to a specimen, broadly comprises means for rotating the load indicating hand in continuous synchronism with any one of the spaced elements whereby the rate of loading is at the desired rate of speed regardless of which spaced element is in alignment with the load indicating hand.

Another advantage of employing a disc is that it provides a background which relative to the load hand is stationary when the disc and hand rotate in synchronism thereby avoiding any distraction to the operator as would otherwise be the case if a fixed background were continually visible. For example, if a rate of load pointer were used instead of a disc, then the main fixed dial 7 would be visible at all times even though the load and speed hands were moving in synchronism. This would cause the fixed dial to constitute a relatively movable background resulting in distraction to the operator or tiring of his eyes.

Hence it is seen that in my improved arrangement I have provided an extremely simple and yet highly accurate means for substantially instantly providing a basis for applying and maintaining a predetermined rate of load to a specimen. Any one of the plurality of rate of load indicating elements, in the form of the markings, is adapted for cooperation with the load device in the form of hand 13. It is also seen that the plurality of elements extend circularly of the path of movement of the load indicating device and also extend in varying radial directions. The elements and device thus have similar paths of movements for the purpose of common visible comparison, that is, common to each other in that they have synchronous movement in alignment with each other.

It will of course be understood that various changes in details of construction and arrangement of parts may be made by those skilled in the art without departing from the spirit of the invention as set forth in the appended claims.

I claim:

1. A rate of loading device comprising, in combination, a rotatable disc having a plurality of spaced elements located thereon at different radial and circumferential positions with respect to the axis of rotation, means for continuously rotating said disc at a predetermined rate of speed, a load indicating element rotatable about the axis of said disc and in superimposed relation thereto so that direct comparison may be made between said indicating element and any one of said spaced elements when in alignment therewith, said indicating element and said disc being relatively immovable when rotated in synchronism with each other, and means for rotating said load indicating element in continuous synchronism with any one of said spaced elements whereby the rate of loading is at said predetermined speed regardless of which spaced element is in alignment with the load indicating element.

2. A rate load device comprising, in combination, a disc rotatable at a predetermined rate of speed and having a plurality of series of spaced elements for determining rate of loading, said series being successively located on said disc at spaced intervals substantially entirely around the face of said disc and each of said series lying along lines offset from the disc axis whereby the spaced elements of each series are located at different radial and circumferential positions with respect to the axis of rotation and the beginning of one series provides substantially an operative continuation of the end of the preceding series, and a load responsive indicating element rotatable about the axis of said disc and in superimposed relaton thereto so that direct visual comparison may be made between said indicating elements and any one of said spaced elements when in alignment therewith whereby when said load indicating element is in continuous synchronism with any one of said spaced elements the disc provides a relatively stationary background for said load indicating element and the rate of loading is at said predetermined rate regardless of which spaced elements is in alignment with the load indicating element.

ALBERT H. EMERY.